(12) United States Patent
Clarke

(10) Patent No.: US 10,807,276 B2
(45) Date of Patent: Oct. 20, 2020

(54) INJECTION MOLDED PREFORM AND MANUFACTURE THEREOF

(71) Applicant: Gr8 Engineering Limited, Chichester, West Sussex (GB)

(72) Inventor: Peter Reginald Clarke, Petworth (GB)

(73) Assignee: GR8 Engineering Limited, Chichester, West Sussex (GB)

( * ) Notice: Subject to any disclaimer, the term of this patent is extended or adjusted under 35 U.S.C. 154(b) by 122 days.

(21) Appl. No.: 15/129,509

(22) PCT Filed: Mar. 27, 2015

(86) PCT No.: PCT/EP2015/056802
§ 371 (c)(1),
(2) Date: Sep. 27, 2016

(87) PCT Pub. No.: WO2015/144915
PCT Pub. Date: Oct. 1, 2015

(65) Prior Publication Data
US 2017/0173825 A1    Jun. 22, 2017

(30) Foreign Application Priority Data

Mar. 28, 2014 (GB) .................................. 1405636.0

(51) Int. Cl.
*B29B 11/08* (2006.01)
*B29B 11/14* (2006.01)
(Continued)

(52) U.S. Cl.
CPC .............. *B29B 11/08* (2013.01); *B29B 11/14* (2013.01); *B29C 45/56* (2013.01); *B29C 49/06* (2013.01);
(Continued)

(58) Field of Classification Search
CPC . B29B 11/08; B29B 11/14; B29B 2911/1438; B29B 2911/14886;
(Continued)

(56) References Cited

U.S. PATENT DOCUMENTS

| | | |
|---|---|---|
| 4,243,620 A | 1/1981 | Curetti et al. |
| 4,959,006 A | 9/1990 | Feddersen et al. |

(Continued)

FOREIGN PATENT DOCUMENTS

| | | |
|---|---|---|
| DE | 20503911 A1 | 8/1976 |
| EP | 2263843 A1 | 12/2010 |

(Continued)

OTHER PUBLICATIONS

Int'l. Search Report and Written Opinion dated Sep. 9, 2015 in corresponding application PCT/EP2015/056802.
(Continued)

*Primary Examiner* — Gerard Higgins
*Assistant Examiner* — Kevin C Ortman, Jr.
(74) *Attorney, Agent, or Firm* — Polsinelli, P.C.

(57) ABSTRACT

An injection moulded thermoplastic preform for blow moulding to form a container, the preform comprising a lower closed base portion, a hollow body portion, a hollow transition portion between the lower closed base portion and the hollow body portion, and an upper open end portion adjacent to an upper part of the hollow body portion, wherein the closed base portion comprises a central portion which extends over at least 50% of an internal radius of a lower end of the hollow body portion and is either substantially flat or has a shallow concave or convex internal curvature, and the transition portion comprises an upwardly and radially outwardly tapering portion extending away from the central portion to connect to the hollow body portion, the tapering portion being inclined at an angle of (Continued)

from 1 to 20 degrees to a longitudinal axis of the preform and the tapering portion increasing in thickness from the central portion to the hollow body portion. Also disclosed is a method of injection moulding the thermoplastic preform.

20 Claims, 4 Drawing Sheets

(51) Int. Cl.
*B29C 49/06* (2006.01)
*B29C 45/56* (2006.01)
*B29C 33/76* (2006.01)
*B29K 101/12* (2006.01)

(52) U.S. Cl.
CPC ............. *B29B 2911/1402* (2013.01); *B29B 2911/1404* (2013.01); *B29B 2911/14026* (2013.01); *B29B 2911/14033* (2013.01); *B29B 2911/1438* (2013.01); *B29B 2911/1464* (2013.01); *B29B 2911/1476* (2013.01); *B29B 2911/14332* (2015.05); *B29B 2911/14338* (2015.05); *B29B 2911/14393* (2013.01); *B29B 2911/14486* (2013.01); *B29B 2911/14633* (2013.01); *B29B 2911/14753* (2013.01); *B29B 2911/14826* (2013.01); *B29B 2911/14886* (2013.01); *B29C 33/76* (2013.01); *B29C 45/561* (2013.01); *B29C 2045/563* (2013.01); *B29K 2101/12* (2013.01)

(58) Field of Classification Search
CPC ... B29B 2911/1476; B29B 2911/14753; B29B 2911/14633; B29B 2911/14486; B29B 2911/14393; B29B 2911/14826; B29B 2911/1404; B29B 2911/14033; B29B 2911/14026; B29B 2911/1402; B29B 2911/14332; B29B 2911/14338; B29B 2911/1464; B29C 45/56; B29C 49/06; B29C 33/76; B29C 45/561; B29C 2045/563; B29K 2101/12
USPC .................................................. 428/339, 421
See application file for complete search history.

(56) References Cited

U.S. PATENT DOCUMENTS

| 5,714,111 | A | 2/1998 | Beck et al. | |
|---|---|---|---|---|
| 2010/0055369 | A1 | 3/2010 | Kelley et al. | |
| 2010/0260886 | A1 | 10/2010 | Witz et al. | |
| 2010/0323136 | A1* | 12/2010 | Yanagimachi | B29B 11/14 428/35.7 |
| 2011/0290758 | A1* | 12/2011 | Detrois | B29C 49/02 215/379 |

FOREIGN PATENT DOCUMENTS

| EP | 2697024 B1 | 6/2015 |
|---|---|---|
| GB | 2048757 A | 12/1980 |
| GB | 2474026 A | 6/2011 |
| JP | 09001639 | 7/1997 |
| WO | 2007060529 A2 | 5/2007 |
| WO | 2012075578 A1 | 6/2012 |

OTHER PUBLICATIONS

Search and Examination Report under Sections 17 and 19(3) dated Sep. 24, 2014 in corresponding application GB1405636.0.

* cited by examiner

INJECTION MOLDED PREFORM AND MANUFACTURE THEREOF

FIELD OF THE INVENTION

The present invention relates to an injection moulded preform and to a method of injection moulding a preform. In particular, the present invention relates to the injection moulding of preforms from thermoplastic material for subsequent formation of blow moulded containers.

BACKGROUND OF THE INVENTION

Injection moulding of articles from plastics materials, in particular thermoplastic polymers, is well known in the art. In particular, the injection moulding of containers, and preforms for containers, from plastics material is conventional in the art.

It is often desired to injection mould plastics containers having a small wall thickness, for example to reduce material costs. When it is necessary to injection mould a container having a high L/T ratio (where L is the flow length of the molten plastics material from the injection inlet and T is the wall thickness), a high injection pressure at the injection inlet is needed to ensure that the mould cavity is filled with the molten plastics material. The injection inlet acts to restrict material flow therethrough, and the wall section directly opposite the injection inlet also restricts the material flow into the cavity.

The conventional approach to attempt to reduce the high injection pressure at the injection inlet is to inject the molten plastics material at a faster injection rate, and to raise the melt temperature to lower the melt viscosity, to enable the mould to be filled by the molten plastics material.

It is also well known that in order to reduce the fill pressure, it is possible when designing a container to increase the base thickness, particularly in the injection inlet area. This injection inlet area is also the hottest area of the injection moulding. As all of the material in the sidewall has to flow across the base, within an interior gap defined between the static exterior skin layers laid down during the first phase of filling, base cooling is always a problem. Another problem with such laminar flow across the base is that the skins are progressively solidifying and therefore getting thicker, narrowing the flow channel. This causes a further restriction on the material flow.

All of this adds up to the need to flow the molten material into the cavity at a faster rate, and to do that one needs to increase the fill pressure. The higher fill pressure will, in turn, require a higher clamp pressure to counter the hydraulic force on the end of the core. It should be readily apparent to the skilled reader why injection moulding machines for the manufacture of plastics packaging need to have very high injection speeds and pressures, and very rigid platens, to make what appears to be a simple container or preform.

The use of high fill pressures often results in non-concentric preforms. The fill pressure is so high that it flexes the core off-axis, resulting in a non-concentric preform. Core flexing is particularly problematic with high aspect ratio length/thickness preforms for forming high aspect ratio bottles which have reduced wall thickness, and are consequently lighter in weight, for any given container volume. The industry standard for acceptable non-concentricity is a maximum wall thickness variation of 0.1 mm for a 42 gram preform for forming a 2 litre carbonated soft drinks (CSD) bottle. However, there is a need to provide higher concentricity for high aspect bottles to permit even greater weight savings to be achieved.

Preforms of increased weight not only incur greater material costs, but also, particularly when used in an injection mould—cool—reheat blow moulding process, require additional thermal energy to heat the thermoplastic material for injection and reheat blow moulding. There is a general need in the art to reduce energy costs during preform and container manufacture.

Even though high fill pressures may be quite high, the molten material flow rate is typically only at an industry standard of up to 15 grams per second, for example for a preform of 3.25 mm wall thickness and a length of 145 mm. This requires a fill time of at least 2 seconds to fill a 30 gram preform cavity. The total cycle time is correspondingly high, for example 22 seconds for a 3.25 mm thickness preform, which may be reduced to 14 seconds using secondary cooling. Production rates are generally increased by increasing the number of mould cavities in the injection moulding apparatus, for example currently up to 216 cavities, which increases the cost and complexity of the injection moulding apparatus. There is a general need in the art to reduce cycle times costs during preform and container manufacture, without excessively increasing the cost and complexity of the injection moulding apparatus.

There is a need in the art for a cost effective, robust injection moulding process for forming preforms that at least partly overcomes the various problems with known processes as discussed above.

In particular, there is a need for an injection moulding process, that is suitable for producing injection moulded preforms for containers, such as bottles or other containers to be subsequently blow moulded from the preform, having high flow-length:wall thickness ratios, and/or low material stress, which can be produced using conventional injection moulding machines and therefore can be interfaced with the minimum of problems into conventional production practices.

The present invention aims at least partly to meet these needs in the art of preform manufacture.

SUMMARY OF THE INVENTION

The present invention provides an injection moulded thermoplastic preform for blow moulding to form a container, the preform comprising a lower closed base portion, a hollow body portion, a hollow transition portion between the lower closed base portion and the hollow body portion, and an upper open end portion adjacent to an upper part of the hollow body portion, wherein the closed base portion comprises a central portion which extends over at least 50% of an internal radius of a lower end of the hollow body portion and is either substantially flat or has a shallow concave or convex internal curvature, and the transition portion comprises an upwardly and radially outwardly tapering portion extending away from the central portion to connect to the hollow body portion, the tapering portion being inclined at an angle of from 1 to 20 degrees to a longitudinal axis of the preform and the tapering portion increasing in thickness from the central portion to the hollow body portion.

The present invention further provides an injection moulded thermoplastic preform for blow moulding to form a container, the preform comprising a lower closed base portion, a hollow body portion having an annular wall, a hollow transition portion between the lower closed base portion and the hollow body portion, and an upper open end portion adjacent to an upper part of the hollow body portion, wherein the closed base portion comprises a central portion which extends over at least 50% of an internal radius of a lower end of the hollow body portion and is either substantially flat or has a shallow concave or convex internal curvature, and the transition portion comprises an upwardly and radially outwardly tapering portion extending away from the central portion to connect to the hollow body portion, the tapering portion being frustoconical and defined between outer and inner frustoconical walls, the tapering portion increasing in thickness from the central portion to the hollow body portion, wherein the outer frustoconical wall is inclined at an angle of from 18 to 24 degrees to a longitudinal axis of the preform and the inner frustoconical wall is inclined at an angle of from 12 to less than 18 degrees to the longitudinal axis of the preform, and the outer frustoconical wall has a length, measured along the outer frustoconical wall between the lower closed base portion and the hollow body portion, of from 3 to 5 times the thickness of the annular wall of the hollow body portion.

The present invention further provides a method of injection moulding a thermoplastic preform for blow moulding to form a container, the method comprising the steps of:

a. providing an injection mould defining a mould cavity for moulding a preform comprising a lower closed base portion, a hollow body portion, a hollow transition portion between the lower closed base portion and the hollow body portion, and an upper open end portion adjacent to an upper part of the hollow body portion, the injection mould comprising a first mould part defining the outer surface of the mould cavity and a second mould part in the form of a movable core defining the inner surface of the mould cavity, b. disposing the movable core in a preliminary forward position, c. injecting molten thermoplastic material into the mould cavity thorough a gate opposite to a free forward end of the core, the free forward end of the core having a central part, which extends over at least 50% of an external radius of the free forward end and is either substantially flat or has a shallow convex or concave external curvature, and a transition part including a radially outwardly tapering part extending away from the central part to connect to an elongate body part of the core, the tapering part being inclined at an angle of from 1 to 20 degrees to a longitudinal axis of the core, d. moving the core rearwardly during the injection, the first mould part and the free forward end of the core forming therebetween, during at least a portion of the injection, an annular substantially frusto-conical funnel connecting a first cavity region adjacent to the gate with a sidewall cavity region, the molten thermoplastic material flowing through the funnel into the sidewall cavity region; and e. moving the core forwardly after at least a proportion of the thermoplastic material has been injected into the mould cavity to dispose the core in a final moulding forward position in which the mould cavity defines the final shape and dimensions of the thermoplastic preform.

The present invention further provides a method of injection moulding a thermoplastic preform for blow moulding to form a container, the method comprising the steps of:

a. providing an injection mould defining a mould cavity for moulding a preform comprising a lower closed base portion, a hollow body portion having an annular wall, a hollow transition portion between the lower closed base portion and the hollow body portion, and an upper open end portion adjacent to an upper part of the hollow body portion, the injection mould comprising a first mould part defining the outer surface of the mould cavity and a second mould part in the form of a movable core defining the inner surface of the mould cavity, the first mould part having an end, including a gate, for forming the base portion, a frustoconical portion for forming the transition portion and an elongate portion for forming the body portion, b. disposing the movable core in a preliminary forward position, c. injecting molten thermoplastic material into the mould cavity thorough the gate opposite to a free forward end of the core, the free forward end of the core having a central part, which extends over at least 50% of an external radius of the free forward end and is either substantially flat or has a shallow convex or concave external curvature, and a transition part including a radially outwardly tapering part extending away from the central part to connect to an elongate body part of the core, the tapering part being frustoconical, d. moving the core rearwardly during the injection, the first mould part and the free forward end of the core forming therebetween, during at least a portion of the injection, an annular substantially frustoconical funnel of progressively decreasing thickness connecting a first cavity region adjacent to the gate with a sidewall cavity region, the molten thermoplastic material flowing through the funnel into the sidewall cavity region, wherein the funnel is formed between the tapering part of the core and the frustoconical portion of the first mould part; and e. moving the core forwardly after at least a proportion of the thermoplastic material has been injected into the mould cavity to dispose the core in a final moulding forward position in which the mould cavity defines the final shape and dimensions of the thermoplastic preform, wherein the tapering part of the core and the frustoconical portion of the first mould part define in the preform the transition portion which comprises an upwardly and radially outwardly tapering portion extending away from the central portion to connect to the hollow body portion, the tapering portion being frustoconical and increasing in thickness from the central portion to the hollow body portion.

The method can be used for injection moulding a variety of preforms for containers which can be circular but optionally having a non-circular or non-rounded, e.g. rectangular, configuration.

The present invention is, in one aspect, predicated on the finding by the present inventor that the provision of a substantially flat or shallow curvature central part of the end of the core and a transition part including a radially outwardly tapering part extending away from the central part, the tapering part being inclined at an angle of from 1 to 20 degrees to a longitudinal axis of the core, can reduce filling time, increase flow velocity and decrease non-concentricity in the resultant preform.

The present invention is, in another aspect, predicated on the finding by the present inventor that the provision of a frustoconical tapering portion defined between outer and inner frustoconical walls, the tapering portion increasing in thickness from the central portion to the hollow body portion, wherein the outer frustoconical wall is inclined at an angle of from 18 to 24 degrees to a longitudinal axis of the preform and the inner frustoconical wall is inclined at an angle of from 12 to less than 18 degrees to the longitudinal axis of the preform, and the outer frustoconical wall has a length, measured along the outer frustoconical wall between the lower closed base portion and the hollow body portion, of from 3 to 5 times the thickness of the annular wall of the hollow body portion can reduce filling time, increase flow velocity and decrease non-concentricity in the resultant preform. This geometry can provide, when a core is retracted during mould filling, a high velocity flowing resin applying a very high force circumferentially around the frustoconical surface of a core which reduces or prevents off-axis movement of the core, and decrease non-concentricity in the resultant preform. The frustoconical tapering configuration provides a high force on the core end even though low pressure is present at the gate.

During at least a portion of the injection, the molten thermoplastic material flows through an annular substantially conical funnel connecting a first cavity region adjacent to the gate with a sidewall cavity region. The large length first cavity region reduces pressure adjacent to the gate and the funnel causes acceleration of the molten resin material into the sidewall cavity region. The low resin pressure at the gate reduces crystallinity in the resultant solidified low thickness base of the preform, resulting in a lightweight preform base of high clarity and low wall thickness. A velocity of the injected molten thermoplastic material increases as the material flows through the funnel from the first cavity region to the sidewall cavity region. During the injection, the pressure of the injected molten thermoplastic material is substantially uniform around the circumference of the annular substantially conical funnel, even at high resin velocity.

The gate pressure can be relatively low, for example from 20,000 to 30,000 kPa, and this pressure is present in the first cavity region adjacent to the gate, and in the funnel surrounding the free end of the core. However, as a result of the progressively narrowing width of the funnel, and the reduction in surface area of the flow path for the resin as it proceeds from the first cavity region to the sidewall forming region via the funnel, the hydraulic force applied to the frustoconical surface of the free end of the core can be very high. For example, the force can be from 5,000 to 10,000 N, optionally from 5,000 to 9,000 N, further optionally from 5,000 to 8,500 N.

It is believed that high resin velocity past the free end of the core, in particular the frustoconical portion, tends to reduce the likelihood of the core wobbling laterally as a result of lateral off-axis pressure differences. The substantially flat or shallow curvature central part also minimises any off-axis biasing force on the free forward end of the core. The cumulative effect of the central part and the funnel is to avoid any off-axis force on the core which could otherwise cause any significant non-concentricity in the preform, while increasing flow velocity and decreasing filing time.

The result is that a very high flow rate of resin can be achieved, for example up to 200 grams per second as compared to 15 grams per second in typical preform injection moulding. The filing time for a typical preform can be significantly reduced, as compared to known typical filling times, to less than 2 seconds for a typical 30 gram preform, even to as low as 0.2 seconds. The weight of the preform can also be significantly reduced for any given preform size to form a blow moulded container of a given size or volume, due to material weight savings in the thinner preform base and sidewall. The weight savings not only reduce material costs but also reduce thermal energy consumption during preform manufacture, requiring molten resin for injection moulding, and during container manufacture by blow moulding the preform into a container, the blow moulding requiring the preform to be heated, or reheated, to the blow moulding temperature. Also since the preform is of reduced weight and higher length:thickness (L/T) ratio, zonal heating or reheating of the preform along its length is facilitated because the length of the preform can be increased, and the wall thickness reduced, for any given preform size to form a blow moulded container of a given size or volume. The preform base design, including the substantially flat or shallow curvature central portion, and corresponding morphology in the core of the mould, reduces biasing forces on the core which can increase the concentricity of the preform even though high resin velocities are employed. The funneling effect increases the resin velocity into the sidewall, allowing high L/T ratios to be achieved with reduced filling time and reduced resin material consumption, which still achieving very high concentricity.

Conversely, when the core is moved forwardly again to the final moulding position the frustoconical tapering portion is defined between outer and inner frustoconical walls, and the tapering portion increases in thickness from the central portion to the hollow body portion. In other words during injection a frustoconical tapering portion of decreasing thickness in the direction of resin flow is provided in the mould cavity when the core is retracted whereas after injection when the core is forward a frustoconical tapering portion of increasing thickness in the direction from the base to the body portion of resin flow is provided in the preform. The tapering direction is reversed by moving the core from the retracted position to the forward position. This reversal of tapering direction provides highly concentric low weight preforms with minimal wall thickness. The core is moved forward after at least a portion of the sidewall has been formed, the injected resin in the sidewall acting to minimize or prevent off-axis movement of the core.

The specific frustoconical geometry, in particular the angles and lengths of the frustoconical inner and outer surfaces, both of the mould parts and the corresponding preform lower part, can provide a high concentric force on the end of the core which enables the lower part of the resultant preform readily to be blow moulded into a bottle with a correct radial stretch ratio.

BRIEF DESCRIPTION OF THE DRAWINGS

Embodiments of the present invention will now be described by way of example only with reference to the accompanying drawing, in which.

DETAILED DESCRIPTION

Figure 1:
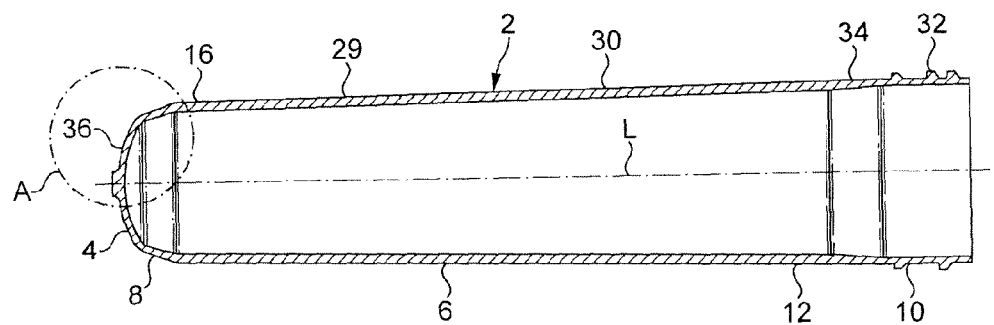
FIG. 1 is a schematic cross-section through an injection moulded preform in accordance with an embodiment of the present invention.
Figure 2:
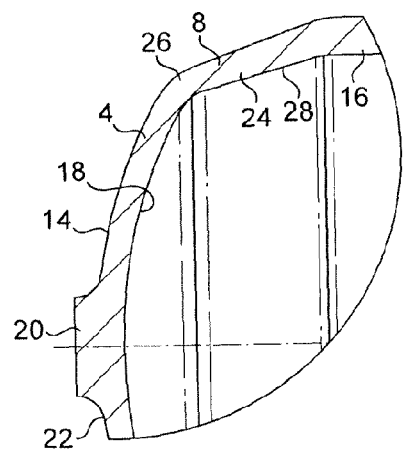
FIG. 2 is an enlarged schematic cross-section through the part of the closed end, indicated as A, of the injection moulded preform of FIG. 1.

Referring to FIGS. 1 and 2, there is shown an injection moulded thermoplastic preform 2 for blow moulding to form a container, in particular a bottle.

The preform 2 is composed of a biaxially orientable polymer, typically polyester, such as polyethylene terephthalate. Typically, the polyethylene terephthalate has an intrinsic viscosity of at least 0.7. Other polyesters, or polyester blends, may be employed, and such materials are well known for the manufacture of blow moulded containers, particularly bottles.

The preform 2 comprises a lower closed base portion 4, a hollow body portion 6, a hollow transition portion 8 between the lower closed base portion 4 and the hollow body portion 6, and an upper open end portion 10 adjacent to an upper part 12 of the hollow body portion 6.

The closed base portion 4 comprises a central portion 14 which extends over at least 50% of an internal radius of a lower end 16 of the hollow body portion 6. The central portion 14 may extend over at least 70%, for example from 75 to 90%, of the internal radius of the lower end 16 of the hollow body portion 6.

The central portion 14 is either substantially flat or has a shallow concave or convex internal curvature. In the illustrated embodiment, the central portion 14 has a shallow concave internal curvature. The central portion 14 is dome shaped and has a shallow concave internal curvature 18 with a minimum radius of internal curvature of 20 mm. Optionally the radius of internal curvature is from 50 to 200 mm, for example from 100 to 200 mm. The central portion 14 typically has a substantially constant radius of internal curvature.

In an alternative embodiment, the central portion is substantially planar.

In a further alternative embodiment, the central portion is dome shaped and has a shallow convex internal curvature with a minimum radius of internal curvature of 20 mm. Optionally the radius of internal curvature is from 50 to 200 mm, for example from 100 to 200 mm. Again, the central portion may have a substantially constant radius of internal curvature.

In any of these embodiments, a thickness of the central portion 14, excluding the thickness of any axial gate portion 20 at an external surface 22 of the central portion 14, is from 0.75 to 1.5 mm, optionally from 0.75 to less than 1 mm. Typically, the thickness of the central portion 14, excluding the thickness of any axial gate portion 20 at the external surface 22 of the central portion 14, is substantially constant.

The transition portion 8 comprises an upwardly and radially outwardly tapering portion 24 extending away from the central portion 14 to connect to the hollow body portion 6. The tapering portion 24 is inclined at an angle of from 1 to 20 degrees, typically from 10 to 20 degrees, to a longitudinal axis L of the preform 2. The tapering portion 24 increases in thickness from the central portion 14 to the hollow body portion 6. The tapering portion 24 typically has a length of at least 5 mm, optionally from 5 to 15 mm. The tapering portion 24 increases in thickness by at least 25%, optionally from 25% to 75%, from a lower end 26 adjacent to the central portion 14 to an upper end 28 adjacent to the hollow body portion 6.

The tapering portion 24 is substantially frusto-conical. The tapering portion 24 typically has a wall length which is from 3 to 10% of the total length of the preform 2. The tapering portion 24 may have a wall thickness of less than 1.5 mm, optionally from 0.75 to less than 1.5 mm.

Typically, at least 75% of the total length of the body portion 6, the transition portion 8 and the base portion 4 has a wall thickness of less than 1.75 mm, optionally from 0.75 to 1.6 mm, further optionally from 0.75 to 1.5 mm. Typically, at least 90%, optionally at least 95%, of the total length of the body portion 6, the transition portion 8 and the base portion 4 has a wall thickness of less than 1.75 mm optionally from 0.75 to 1.6 mm, further optionally from 0.75 to 1.5 mm. Typically, the body portion 6 has a maximum wall thickness variation of 5%, optionally 2.5%, of the average wall thickness of the body portion 6.

In the illustrated embodiment, a majority of the length of the body portion 6 is substantially tubular. The external surface 29 of the body portion 6 tapers radially outwardly at an angle of 1 degree or less in a direction from the transition portion 8 to the upper open end portion 10. The cross-section of the body portion 6 is substantially cylindrical, substantially elliptical or substantially polygonal along at least 50%, optionally at least 90%, of the length of the body portion 6. Preferably, a wall section 30 of the body portion 6 has a length:thickness ratio of at least 75:1, optionally from 75:1 to 150:1 to enable manufacture of a blow moulded container having an L/T ratio of at least 75:1, optionally from 75:1 to 150:1.

In the illustrated embodiment, the upper open end portion 10 includes a neck finish 32 and an internal taper region 34 connecting the body portion 6 to the neck finish 32.

In the illustrated embodiment, the external surface 36 of the closed base portion 4 of the preform 2 is dimensioned so as to be incapable of being lockingly fitted into the open end portion 10 of an identical preform 2. Such non-locking preforms are suitable for blow moulding to form bottles.

The preform 2 may be shaped and dimensioned for forming a bottle, with the body portion 6 having any one of the following dimensions: (i) a length of from 50 mm to 65 mm and a maximum wall thickness variation of less than 0.04 mm; (ii) a length of from 65 mm to 85 mm and a maximum wall thickness variation of less than 0.05 mm; (iii) a length of from 85 mm to 100 mm and a maximum wall thickness variation of less than 0.06 mm; (iv) a length of from 100 mm to 120 mm and a maximum wall thickness variation of less than 0.07 mm; (v) a length of from 120 mm to 140 mm and a maximum wall thickness variation of less than 0.08 mm; (vi) a length of from 140 mm to 160 mm and a maximum wall thickness variation of less than 0.1 mm; (vii) a length of from 160 mm to 180 mm and a maximum wall thickness variation of less than 0.12 mm; (viii) a length of from 180 mm to 200 mm and a maximum wall thickness variation of less than 0.15 mm; (ix) a length of from 200 mm to 250 mm and a maximum wall thickness variation of less than 0.2 mm; (x) a length of from 250 mm to 300 mm and a maximum wall thickness variation of less than 0.3 mm; (xi) a length of from 300 mm to 400 mm and a maximum wall thickness variation of less than 0.4 mm; or (xii) a length of from 400 mm to 500 mm and a maximum wall thickness variation of less than 0.5 mm.

Figure 3:
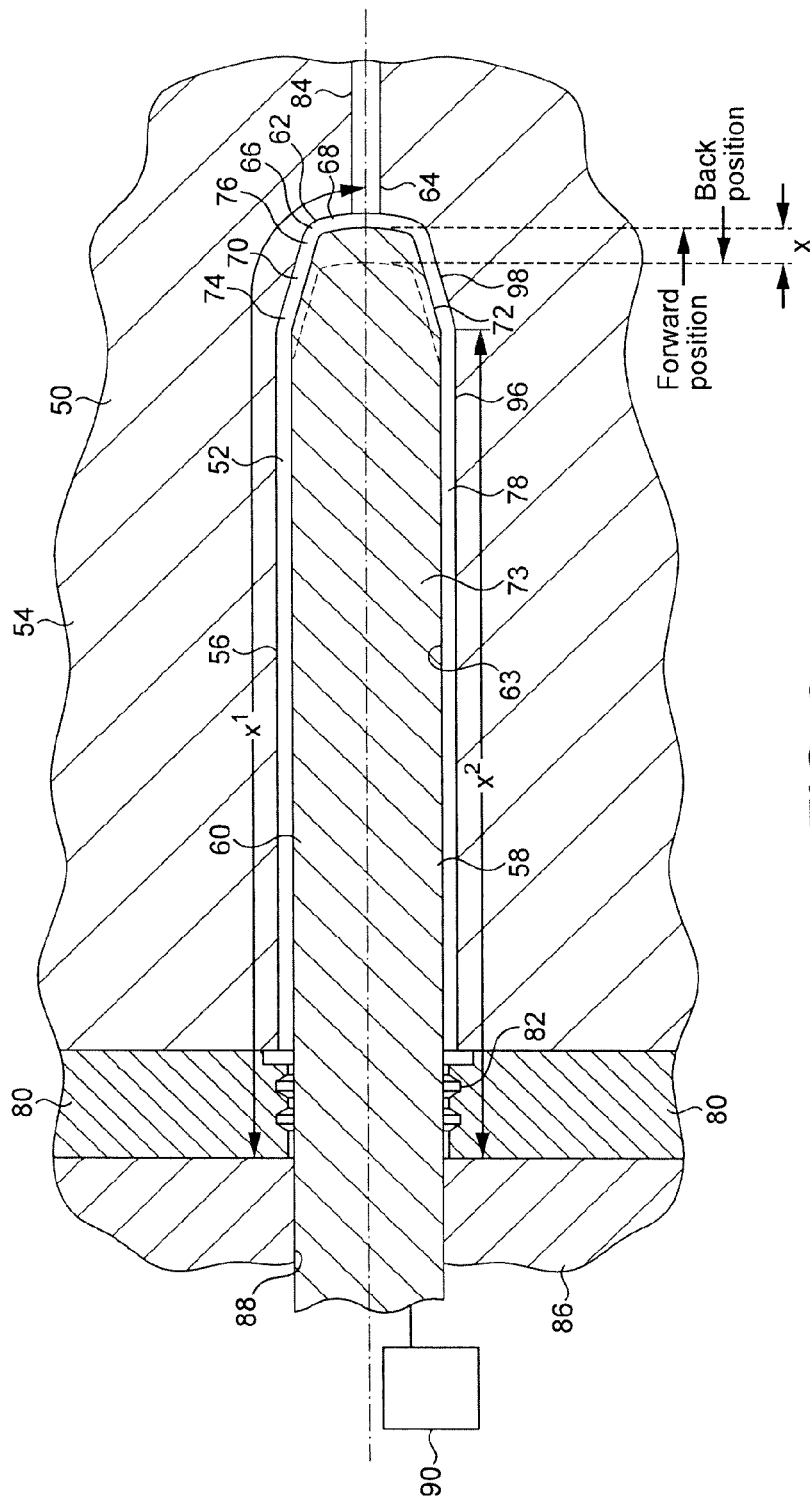
FIG. 3 is a schematic cross-section through an injection mould having a movable core for use in a method in accordance with an embodiment of the present invention.

Referring to FIG. 3, there is shown a method of injection moulding the thermoplastic preform 2 for blow moulding to form a container, in particular a bottle.

In the method, there is provided an injection mould 50 defining a mould cavity 52 for moulding a preform 2, such as the preform 2 of FIG. 1. As described above, the preform 2 comprises a lower closed base portion 4, a hollow body portion 6, a hollow transition portion 8 between the lower closed base portion 4 and the hollow body portion 6, and an upper open end portion 10 adjacent to an upper part 12 of the hollow body portion 6. The injection mould 50 comprises a first mould part 54 defining the outer surface 56 of the mould cavity 52 and a second mould 58 part in the form of a movable elongate core 60 defining the inner surface 63 of the mould cavity 52. The mould 50 is provided with an injection inlet in the form of a gate 64 that does not have a valve.

A plurality of neck splits 80 is provided at the end 82 of the cavity 52 remote from the feed nozzle 84 exiting at the gate 64. The neck splits 80 are shaped to mould the outer shape of one end of the preform 2 to be injection moulded, in this embodiment the neck finish 32 of the preform 2 for subsequent blow moulding to form a bottle. The neck splits 80 also support the injection moulded preform 2 when it is removed from the cavity 52 after the injection moulded material has solidified.

A core bearing 86 is adjacent to the plurality of neck splits 80 and has a central bore 88 in which the core 60 is slidably received. The core 60 can be translated in a longitudinal direction coaxial with the axis of the cavity 52 and with the feed nozzle 84. Accordingly, the core 60 can selectively be slid in the core bearing 86 either forwardly in a direction into the cavity 52 towards the feed nozzle 84 or rearwardly in a direction out of the cavity 52 away from the feed nozzle 84. Such forward and backward movement can vary the distance of the free forward end 66 of the core 60 from the feed nozzle 84. The core 60 and the neck splits 80 are axially centered with respect to the axis of the cavity 52.

A pressure actuator 90, illustrated entirely schematically in FIG. 2, pushes the core 60. The pressure actuator 90 may be pneumatically controlled, for example the pneumatic fluid being compressed air, or hydraulically controlled. Typically, the maximum applied pressure of the pressure actuator 90 is less than 20 bars pneumatically; however, for large cavitation moulds hydraulic actuators would be used at pressures up to 225 bars.

The pressure actuator 90 can be selectively pressurised to urge the core 60 to a forward position as shown in FIG. 2. The forward position can be defined by a mechanical stop or by interlocking of the two mould parts comprised of the fixed mould part 54 and the movable core 60.

If the pressure actuator 90 is not actuated, or only actuated at a low pressure which is lower than the injection pressure at the feed nozzle 84, then the injection pressure from the injecting molten resin material through the gate 64 can urge the core 60 rearwardly to the rearward position as shown in FIG. 2. The rearward position can be defined by a mechanical stop.

The first and second mould parts 54, 58 are disposed in a fully closed configuration so as to define the mould cavity 52 therebetween for moulding the preform 2. In the fully closed configuration the cavity outer surface 56 defines the outer shape of the preform 2 to be moulded in the mould cavity 52.

The movable core 60 is disposed in a preliminary forward position. This temporarily locates the core 60 towards the centre part 62 of the outer surface 56 of the mould cavity 52, at substantially, or near to, the final moulding position of the core 60.

Before, or in the initial phase of, the injection moulding cycle the actuator pressure is low or off.

Then molten thermoplastic material is injected into the mould cavity 52 thorough the valveless gate 64 opposite to the free forward end 66 of the core 60.

Consequently, the core 60 can be urged by the injection pressure in a direction away from the gate 64 which causes the core 60 to move back smoothly against the injection pressure. This moves the core 60 to the position shown by dashed lines in FIG. 2. This increases the thickness T of the portion of the cavity 52 adjacent to the gate 64 by the distance x. The length of preform having the desired relatively small final wall thickness is correspondingly reduced from distance $x^1$ to $x^2$, as also shown in FIG. 2. Accordingly, the L/T ratio is significantly reduced, thereby to keep the injection pressure within the cavity 52, in particular in the vicinity of the gate 64, at a low or minimal value.

The free forward end 66 of the core 60 has a central part 68, which extends over at least 50% of an external radius of the free forward end 66. The central part 68 is either substantially flat or has a shallow convex or concave external curvature, and is shaped to mould the internal surface of the closed end portion 4 of the preform 2, as shown in FIG. 1. The free forward end 66 of the core 60 also has a transition part 70 including a radially outwardly frusto-conically tapering part 72 extending away from the central part 68 to connect to an elongate body part 73 of the core 60. The tapering part 72 is inclined at an angle of from 1 to 20 degrees to a longitudinal axis of the core 60. The tapering part 72 is shaped to mould the internal surface of the transition portion 8 of the preform 2, as shown in FIG. 1. The first mould part 54 includes a radially outwardly frusto-conically tapering wall 98 extending away from the centre part 62 to connect to an elongate wall 96.

The core 60 is moved rearwardly during the injection, in other words away from the centre part 62 of the outer surface 56 of the mould cavity 52 and away from the gate 64. This rearward movement increases the volume of the mould cavity 52 in the fully closed configuration and reduces the flow length/thickness ratio of the portion of the cavity 52 adjacent to the gate 64.

The first mould part 54 and the free forward end 66 of the core 60 therefore form therebetween, during at least a portion of the injection, an annular substantially conical funnel 74 connecting a first cavity region 76 adjacent to the gate 64 with a sidewall cavity region 78. The molten thermoplastic material flows through the funnel 74 into the sidewall cavity region 78. A velocity of the injected molten thermoplastic material increases as the material flows through the funnel 74 from the first cavity region 76 to the sidewall cavity region 78. During the injection, the pressure of the injected molten thermoplastic material is substantially uniform around the circumference of the annular substantially conical funnel 74. The substantially flat or shallow curvature central part minimises any off-axis biasing force on the free forward end 66 of the core 60. The cumulative effect of the central part and the funnel is to avoid any off-axis force on the core which could otherwise cause any significant non-concentricity in the preform 2.

After or during mould filling, the pressure actuator 90 urges the core 60 forwardly in a direction into the cavity 52 towards the gate 64, subject to the forward pressure applied to the core 60 overcoming any reverse injection pressure still in the cavity 52. The core 60 is returned to the original forward position which defines the final container shape and dimensions, thereby expelling any excess material back through the gate 64.

Accordingly, the core 60 is moved forwardly after at least a proportion of the thermoplastic material has been injected into the mould cavity 52 to dispose the core 60 in a final moulding forward position in which the mould cavity 52 defines the final shape and dimensions of the thermoplastic preform 2. During the forward core movement, the pressure of the injected molten thermoplastic material is substantially uniform around the circumference of the annular substantially conical funnel 74.

The mould cavity 52 is filled with the molten thermoplastic material. After filling the mould cavity 52, during the return of the core 60 from the rearward position to the forward position, excess molten material may be expelled back through the gate 64 against a holding phase pressure which is less than the injection pressure. The holding phase pressure is applied to the injected material by an injection apparatus, the holding phase pressure being selected to accommodate shrinkage of the injected material within the mould during cooling. After the injected material has solidified, the applied external pressure is reduced during cooling of the injected material. The reduction of the applied external pressure can be triggered at the start of the cooling phase, or after a short delay to allow the injection pressure to diminish.

For at least a part of the injection step, or for all of the injection step, the molten thermoplastic material is injected into the mould cavity 52 thorough the gate 64 at a flow rate of from 20 to 200 grams per second, optionally from 40 to 200 grams per second, further optionally from 40 to 100 grams per second or 100 to 200 grams per second. The injection step is typically carried out in a period of less than 2 seconds, optionally less than 1 second, further optionally less than 0.5 seconds, still further optionally less than 0.2 seconds, further optionally from 0.075 to 0.125 seconds.

Typically, the injection step, the rearward core movement to form the funnel and the subsequent forward core movement to the final moulding forward position are carried out over a total time period of less than 10 seconds, optionally less than 8 seconds, optionally from 3 to less than 6 seconds.

The core 60 is urged into the forward position by an applied external pressure, applied by an actuator, and moved to the rearward position by pressure of the injecting molten material. The actuator pressure is less than 20 bar, when applied by compressed air or 225 bar for a hydraulic fluid. Typically, an area ratio between the actuator area and the area of the core is less than 20:1 for pneumatic actuation.

After substantially filling the mould, the mould surface is restored to its original position. There is no increase in component weight or cooling time. The excess material is pushed back through the open injection inlet against the low holding phase pressure.

Preferably, the at least one movable portion is urged into the forward position by an applied external pressure, applied by an actuator, and moved to the rearward position by pressure of the injecting molten material. The actuator pressure may be less than 20 bar, and typically applied by compressed air when using an area ratio of 20:1, where 20 is the area of the actuator and 1 is the projected area of the moving core. It will be readily apparent to those skilled in the art that smaller actuators could be used with higher pressures, such as typically used with hydraulic actuator systems i.e. 140 bar. A single actuator may be provided for plural mould cavities.

Preferably, after the injected material has solidified, the applied external pressure is reduced during cooling of the injected material. This can be triggered at the start of the cooling phase or after a short delay to allow the pressure to diminish. This provides the advantage that the cavity pressure is reduced before opening the mould. This reduces the cooling time required before opening the mould.

Accordingly, the present invention provides a method which actively changes the L/T ratio during injection by allowing the core to move back, before or during injection, to effectively lessen the L/T ratio. After the filling and holding phase, applied to the material within the mould, the core is re-set. This substantially reduces the force required as there is no counter filling pressure from the moulding machine because the material has already fully filled the cavity and any shrinkage has been substantially accommodated by the holding phase.

Optionally, the container has an L/T ratio of 50:1 or greater, wherein where L is the flow length of the molten plastics material from the injection inlet and T is the wall thickness.

The method of this invention in employs a mould in an injection moulding machine in which the filling pressure of the injected material to be moulded is controlled by moving a core, or a part of a core, away from the injection inlet. This movement of a mould part can vary the volume of the base portion of the mould cavity, and increase the base thickness opposite the injection inlet and so reduces the L/T ratio, and thereby reduce the filling pressure of the injected material.

Figure 4:
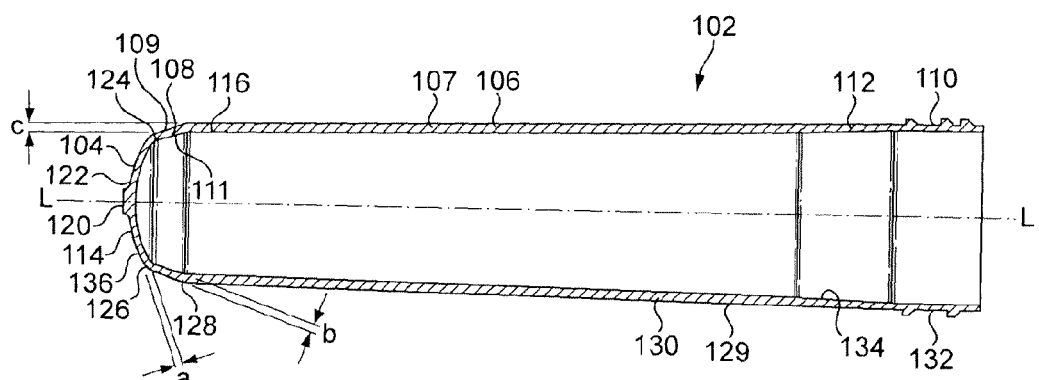
FIG. 4 is a schematic cross-section through an injection moulded preform in accordance with a further embodiment of the present invention.
Figure 5:
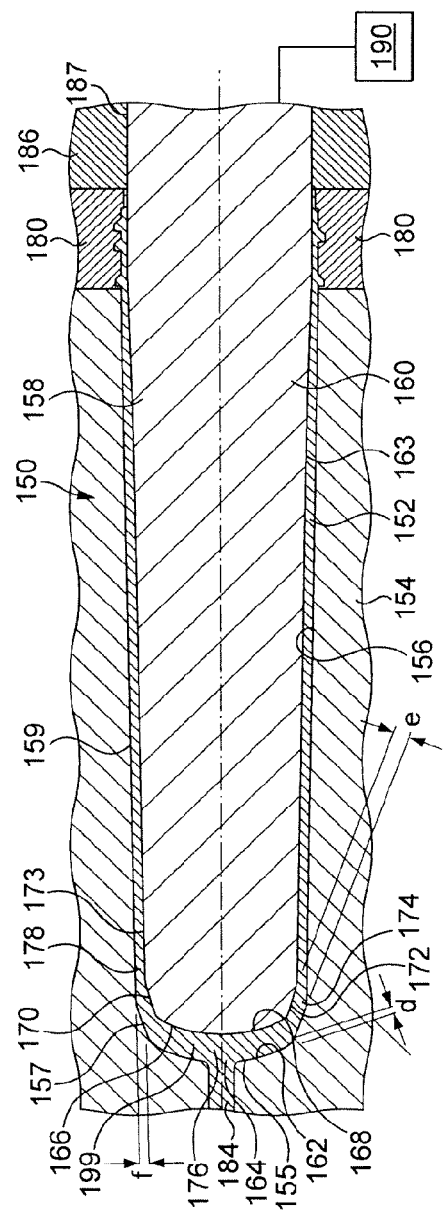
FIG. 5 is a schematic cross-section through an injection mould having a movable core for use in a method for making the preform of FIG. 4.

FIG. 4 is a schematic cross-section through an injection moulded preform in accordance with a further embodiment of the present invention and FIG. 5 is a schematic cross-section through an injection mould having a movable core for use in a method for making the preform of FIG. 4.

Referring to FIG. 4, there is shown an injection moulded thermoplastic preform 102 for blow moulding to form a container, in particular a bottle.

The preform 102 is composed of a biaxially orientable polymer, typically polyester, such as polyethylene terephthalate. Typically, the polyethylene terephthalate has an intrinsic viscosity of at least 0.7. Other polyesters, or polyester blends, may be employed, and such materials are well known for the manufacture of blow moulded containers, particularly bottles.

The preform 102 comprises a lower closed base portion 104, a hollow body portion 106 having an annular wall 107, a hollow transition portion 108 between the lower closed base portion 104 and the hollow body portion 106, and an upper open end portion 110 adjacent to an upper part 112 of the hollow body portion 6.

The closed base portion 104 comprises a central portion 114 which extends over at least 50% of an internal radius of a lower end 116 of the hollow body portion 106. The central portion 114 may extend over at least 70%, for example from 75 to 90%, of the internal radius of the lower end 116 of the hollow body portion 106.

The central portion 114 is either substantially flat or has a shallow concave or convex internal curvature. In the illustrated embodiment, the central portion 114 has a shallow concave internal curvature. The central portion 114 is dome shaped and has a shallow concave internal curvature 118 with a minimum radius of internal curvature of 20 mm. Optionally the radius of internal curvature is from 50 to 200 mm, for example from 100 to 200 mm. The central portion 114 typically has a substantially constant radius of internal curvature.

In an alternative embodiment, the central portion 114 is substantially planar.

In a further alternative embodiment, the central portion 114 is dome shaped and has a shallow convex internal curvature with a minimum radius of internal curvature of 20 mm. Optionally the radius of internal curvature is from 50 to 200 mm, for example from 100 to 200 mm. Again, the central portion 114 may have a substantially constant radius of internal curvature.

In any of these embodiments, a thickness of the central portion 114, excluding the thickness of any axial gate portion 120 at an external surface 122 of the central portion 114, is from 0.75 to 1.5 mm, optionally from 1 to 1.25 mm. Typically, the thickness of the central portion 114, excluding the thickness of any axial gate portion 120 at the external surface 122 of the central portion 114, is substantially constant.

The transition portion 108 comprises an upwardly and radially outwardly tapering portion 124 extending away from the central portion 114 to connect to the hollow body portion 106. The tapering portion 108 is frustoconical and defined between outer and inner frustoconical walls 109, 111. The tapering portion 108 increases in thickness from the central portion 114 to the hollow body portion 106. The outer frustoconical wall 109 is inclined at an angle of from 18 to 24 degrees to the longitudinal axis L of the preform 102 and the inner frustoconical wall 111 is inclined at an angle of from 12 to less than 18 degrees to the longitudinal axis of the preform 102. Preferably, the outer frustoconical wall 109 is inclined at an angle of from 19 to 22 degrees to the longitudinal axis of the preform 102 and the inner frustoconical wall 111 is inclined at an angle of from 14 to 17 degrees to the longitudinal axis of the preform 102. Typically, the outer frustoconical wall 109 is inclined at an angle of from 19.5 to 20.5 degrees to the longitudinal axis of the preform 102 and the inner frustoconical wall 111 is inclined at an angle of from 15 to 16 degrees to the longitudinal axis of the preform 102.

The outer frustoconical wall 109 has a length, measured along the outer frustoconical wall 109 between the lower closed base portion 104 and the hollow body portion 106, of from 3 to 5 times, preferably from 3.5 to 4.5 times, the thickness of the annular wall 107 of the hollow body portion 106. The tapering portion 124 typically has a length of at least 5 mm, optionally from 5 to 15 mm, further optionally from 5 to 8 mm. The tapering portion 124 increases in thickness by at least 10%, optionally from 12% to 18%, from a lower end 126 adjacent to the central portion 114 (thickness a in FIG. 4) to an upper end 128 adjacent to the hollow body portion 106 (thickness b in FIG. 4).

The thickness of the tapering portion 124, measured at the upper end 128 thereof adjacent to the hollow body portion 106 (thickness b in FIG. 4), is less than the thickness of the hollow body portion 106 (thickness c in FIG. 4). Typically, the thickness of the tapering portion 124, measured at the upper end 128, is at least 0.1 mm, optionally from 0.1 to 0.2 mm, less than the thickness of the hollow body portion 106. Typically, the thickness of the tapering portion 124, measured at the lower end 126 thereof adjacent to the central portion 114, is at least 0.2 mm, optionally from 0.2 to 0.35 mm, further optionally from 0.25 to 0.3 mm, less than the thickness of the hollow body portion 106. The tapering portion 124 may have a wall thickness of from 1 to less than 1.5 mm.

Typically, at least 75% of the total length of the body portion 106, the transition portion 108 and the base portion 104 has a wall thickness of less than 1.75 mm, optionally from 0.75 to 1.6 mm, further optionally from 0.75 to 1.5 mm, yet further optionally from 1 to 1.5 mm. Typically, at least 90%, optionally at least 95%, of the total length of the body portion 106, the transition portion 108 and the base portion 104 has a wall thickness of less than 1.75 mm, optionally from 0.75 to 1.6 mm, further optionally from 0.75 to 1.5 mm, yet further optionally from 1 to 1.5 mm. Typically, the body portion 106 has a maximum wall thickness variation of 5%, optionally 2.5%, of the average wall thickness of the body portion 106.

In the illustrated embodiment, a majority of the length of the body portion 106 is substantially tubular. The external surface 129 of the body portion 106 typically tapers radially outwardly at an angle of 1 degree or less in a direction from the transition portion 108 to the upper open end portion 110. The cross-section of the body portion 106 is substantially cylindrical, substantially elliptical or substantially polygonal along at least 50%, optionally at least 90%, of the length of the body portion 106. Preferably, a wall section 130 of the body portion 106 has a length:thickness ratio of at least 75:1, optionally from 75:1 to 150:1 to enable manufacture of a blow moulded container having an L/T ratio of at least 75:1, optionally from 75:1 to 150:1.

In the illustrated embodiment, the upper open end portion 110 includes a neck finish 132 and an internal taper region 134 connecting the body portion 106 to the neck finish 132.

In the illustrated embodiment, the external surface 136 of the closed base portion 104 of the preform 102 is dimensioned so as to be incapable of being lockingly fitted into the open end portion 110 of an identical preform 102. Such non-locking preforms are suitable for blow moulding to form bottles.

The preform 102 may be shaped and dimensioned for forming a bottle, with the body portion 6 having any one of the following dimensions: (i) a length of from 50 mm to 65 mm and a maximum wall thickness variation of less than 0.04 mm; (ii) a length of from 65 mm to 85 mm and a maximum wall thickness variation of less than 0.05 mm; (iii) a length of from 85 mm to 100 mm and a maximum wall thickness variation of less than 0.06 mm; (iv) a length of from 100 mm to 120 mm and a maximum wall thickness variation of less than 0.07 mm; (v) a length of from 120 mm to 140 mm and a maximum wall thickness variation of less than 0.08 mm; (vi) a length of from 140 mm to 160 mm and a maximum wall thickness variation of less than 0.1 mm; (vii) a length of from 160 mm to 180 mm and a maximum wall thickness variation of less than 0.12 mm; (viii) a length of from 180 mm to 200 mm and a maximum wall thickness variation of less than 0.15 mm; (ix) a length of from 200 mm to 250 mm and a maximum wall thickness variation of less than 0.2 mm; (x) a length of from 250 mm to 300 mm and a maximum wall thickness variation of less than 0.3 mm; (xi) a length of from 300 mm to 400 mm and a maximum wall thickness variation of less than 0.4 mm; or (xii) a length of from 400 mm to 500 mm and a maximum wall thickness variation of less than 0.5 mm.

Referring to FIG. 5, there is shown a method of injection moulding the thermoplastic preform 102 for blow moulding to form a container, in particular a bottle.

In the method, there is provided an injection mould 150 defining a mould cavity 152 for moulding a preform 102, such as the preform 102 of FIG. 4. As described above, the preform 102 comprises a lower closed base portion 104, a hollow body portion 106 having an annular wall 107, a hollow transition portion 108 between the lower closed base portion 104 and the hollow body portion 106, and an upper open end portion 110 adjacent to an upper part 112 of the hollow body portion 106. The injection mould 150 comprises a first mould part 154 defining the outer surface 156 of the mould cavity 152 and a second mould 158 part in the form of a movable elongate core 160 defining the inner surface 163 of the mould cavity 152. The mould 150 is provided with an injection inlet feed nozzle 184 in the form of a gate 164 that does not have a valve. The first mould part 154 has an end 155, including the gate 164, for forming the base portion 104, a frustoconical portion 157 for forming the transition portion 108 and an elongate portion 159 for forming the body portion 106.

A plurality of neck splits 180 as described in FIG. 3 is provided at the end of the cavity 152 remote from the feed nozzle 184 exiting at the gate 164. The neck splits are shaped to mould the outer shape of one end of the preform 102 to be injection moulded, in this embodiment the neck finish 132 of the preform 102 for subsequent blow moulding to form a bottle. The neck splits also support the injection moulded preform 102 when it is removed from the cavity 152 after the injection moulded material has solidified.

A core bearing 186 as described in FIG. 3 is adjacent to the plurality of neck splits and has a central bore 187 in which the core 160 is slidably received. The core 160 can be translated in a longitudinal direction coaxial with the axis of the cavity 152 and with the feed nozzle 184. Accordingly, the core 160 can selectively be slid in the core bearing either forwardly in a direction into the cavity 152 towards the feed nozzle 184 or rearwardly in a direction out of the cavity 152 away from the feed nozzle 184. Such forward and backward movement can vary the distance of the free forward end 166 of the core 160 from the feed nozzle 184. The core 160 and the neck splits 180 are axially centered with respect to the axis of the cavity 152.

A pressure actuator 190 as described in FIG. 3 pushes the core 160. The pressure actuator 190 may be pneumatically controlled, for example the pneumatic fluid being compressed air, or hydraulically controlled. Typically, the maximum applied pressure of the pressure actuator 190 is less than 20 bars pneumatically; however, for large cavitation moulds hydraulic actuators would be used at pressures up to 225 bars.

The pressure actuator 190 can be selectively pressurised to urge the core 160 to a forward position from the rearward position shown in FIG. 5. The forward position can be defined by a mechanical stop or by interlocking of the two mould parts comprised of the fixed mould part 154 and the movable core 160.

If the pressure actuator 190 is not actuated, or only actuated at a low pressure which is lower than the injection pressure at the feed nozzle 184, then the injection pressure from the injecting molten resin material through the gate 164 can urge the core 160 rearwardly to the rearward position as shown in FIG. 5. The rearward position can be defined by a mechanical stop.

The first and second mould parts 154, 158 are disposed in a fully closed configuration so as to define the mould cavity 152 therebetween for moulding the preform 102. In the fully closed configuration the cavity outer surface 156 defines the outer shape of the preform 102 to be moulded in the mould cavity 152.

The movable core 160 is disposed in a preliminary forward position. This temporarily locates the core 160 towards the centre part 162 of the outer surface 156 of the mould cavity 152, at substantially, or near to, the final moulding position of the core 160.

Before, or in the initial phase of, the injection moulding cycle the actuator pressure is low or off.

Then molten thermoplastic material is injected into the mould cavity 152 thorough the valveless gate 164 opposite to the free forward end 166 of the core 160.

Consequently, the core 160 can be urged by the injection pressure in a direction away from the gate 164 which causes the core 160 to move back smoothly against the injection pressure. This moves the core 160 to the position shown in FIG. 5. This increases the thickness T of the portion 199 of the cavity 152 adjacent to the gate 164 by the distance x. The length of preform having the desired relatively small final wall thickness is correspondingly reduced. Accordingly, the L/T ratio is significantly reduced, thereby to keep the injection pressure within the cavity 152, in particular in the vicinity of the gate 164, at a low or minimal value.

The free forward end 166 of the core 160 has a central part 168, which extends over at least 50%, optionally at least 70%, further optionally from 75 to 90%, of an external radius of the free forward end 166. The central part 168 is either substantially flat or has a shallow convex or concave external curvature, and is shaped to mould the internal surface of the closed end portion 104 of the preform 102, as shown in FIG. 4. The central part 168 is dome shaped and has a shallow convex external curvature, typically a substantially constant radius of external curvature, with a minimum radius of external curvature of 20 mm, optionally the radius of external curvature being from 50 to 200 mm, optionally from 100 to 200 mm.

The free forward end 166 of the core 160 also has a transition part 170 including a radially outwardly frustoconical tapering part 172 extending away from the central part 168 to connect to an elongate body part 173 of the core 160. The tapering part 172 is shaped to mould the internal surface of the transition portion 108 of the preform 102, as shown in FIG. 4. The tapering part 172 of the core 160 and the frustoconical portion 157 of the first mould part 154 define in the preform 102 the transition portion 108 which comprises an upwardly and radially outwardly tapering portion 124 extending away from the central portion 114 to connect to the hollow body portion 108, the tapering portion 124 being frustoconical and increasing in thickness from the central portion 114 to the hollow body portion 108.

Preferably, the frustoconical portion 157 of the first mould part 154 is inclined at an angle of from 18 to 24 degrees to the longitudinal axis of the first mould part 154 and the frustoconical tapering part 172 of the core 160 is inclined at an angle of from 12 to less than 18 degrees to the longitudinal axis of the core 160. More preferably, the frustoconical portion 157 of the first mould part 154 is inclined at an angle of from 19 to 22 degrees to the longitudinal axis of the first mould part 154 and the frustoconical tapering part 172 of the core 160 is inclined at an angle of from 14 to 17 degrees to the longitudinal axis of the core 160. Typically, the frustoconical portion 157 of the first mould part 154 is inclined at an angle of from 19.5 to 20.5 degrees to the longitudinal axis of the first mould part 154 and the frustoconical tapering part 172 of the core 160 is inclined at an angle of from 15 to 16 degrees to the longitudinal axis of the core 160.

Preferably, the frustoconical portion 157 of the first mould part 154 has a length, measured along the frustoconical portion 157 between the closed end 155 and the elongate portion 159, of from 3 to 5 times, optionally from 3.5 to 4.5 times, the thickness of the annular wall 107 of the hollow body portion 108.

The core 160 is moved rearwardly during the injection, in other words away from the centre part 162 of the outer surface 156 of the mould cavity 152 and away from the gate 164. This rearward movement increases the volume of the mould cavity 152 in the fully closed configuration and reduces the flow length/thickness ratio of the portion of the cavity 152 adjacent to the gate 164. The core 160 is preferably moved rearwardly by a distance which is from 2 to 6 times, optionally from 3 to 5 times, the thickness of the annular wall 107 of the hollow body portion 108.

The first mould part 154 and the free forward end 166 of the core 160 therefore form therebetween, during at least a portion of the injection, an annular substantially frustoconical funnel 174 connecting a first cavity region 176 adjacent to the gate 164 with a sidewall cavity region 178. The molten thermoplastic material flows through the funnel 174 into the sidewall cavity region 178. The funnel 174 is formed between the tapering part 172 of the core 160 and the frustoconical portion 157 of the first mould part 154. The substantially frustoconical funnel 174 decreases in thickness and increases in radius in a direction from the first cavity region 176 to the sidewall cavity region 178.

The core 160 is preferably moved rearwardly to provide that an end of the first cavity region 176 adjacent to the funnel 174 (thickness d in FIG. 5) has a thickness of from 3 to 5 mm, optionally from 3.5 to 4.5 mm, an end of the funnel 174 adjacent to the sidewall cavity region 178 (thickness e in FIG. 5) has a thickness of from 1.75 to less than 3 mm, optionally from 2 to 2.5 mm and the sidewall cavity region 178 (thickness f in FIG. 5) has a thickness of from 1 to 1.7 mm, optionally from 1.2 to 1.5 mm.

A hydraulic force is applied, by the pressurised molten thermoplastic material flowing through the funnel 174 into the sidewall cavity region 178, on the frustoconical tapering part 172. Preferably, the injection pressure of the molten thermoplastic material flowing through the gate 164 is from 20,000 to 30,000 kPa. The hydraulic force applied by the molten thermoplastic material flowing through the funnel 174 into the sidewall cavity region 178 to the frustoconical tapering part 172 of the free end 166 of the core 160 can be very high. For example, the force can be from 5,000 to 10,000 N, optionally from 5,000 to 9,000 N, further optionally from 5,000 to 8,500 N. For example, if the hydraulic pressure is 20,000 kPa, and the frustoconical tapering part 172 has an area of 2.76 cm$^2$ the force applied to the frustoconical tapering part 172 is 5,520 N. Such a high force minimises or prevents inadvertent off-axis deformation of the core 160 during resin injection, providing very high uniformity of sidewall thickness circumferentially around the resultant preform 102.

A velocity of the injected molten thermoplastic material increases as the material flows through the funnel 174 from the first cavity region 176 to the sidewall cavity region 178. Typically, the maximum velocity is from 150 to 250 mm/second where the material flows from the annular substantially frustoconical funnel 174 into the sidewall cavity region 178. During the injection, the pressure of the injected molten thermoplastic material is substantially uniform around the circumference of the annular substantially frustoconical funnel 174. The substantially flat or shallow curvature central part minimises any off-axis biasing force on the free forward end 166 of the core 160. The cumulative effect of the central part and the funnel is to avoid any off-axis force on the core which could otherwise cause any significant non-concentricity in the preform 102.

After or during mould filling, the pressure actuator urges the core 160 forwardly in a direction into the cavity 152 towards the gate 164, subject to the forward pressure applied to the core 160 overcoming any reverse injection pressure still in the cavity 152. The core 160 is preferably moved forwardly after from 25 to 95%, optionally from 25 to 75%, of the length of the sidewall cavity region 178 has been filled with molten thermoplastic material. If the core 160 is moved forwardly before there has been sufficient filling of the sidewall cavity region 178, the forward movement may cause inadvertent off-axis movement of the core 160, which introduces asymmetry and variations in the wall thickness. If the core 160 is moved forwardly after there has been excessive partial filling of the sidewall cavity region 178, the forward movement may be restricted or prevented by excessive resin pressure in the cavity, which may in turn restrict or prevent complete filling of the neck finish and the open end of the preform 102.

The core 160 is returned to the original forward position which defines the final container shape and dimensions, thereby expelling any excess material back through the gate 164. In the final moulding forward position the central part 168 is typically spaced from the outer surface of the mould cavity, at the end 155 adjacent to the gate 164, by a distance of less than 1.75 mm optionally from 0.75 to 1.6 mm, further optionally from 0.75 to 1.5 mm, yet further optionally from 1 to 1.5 mm.

Accordingly, the core 160 is moved forwardly after at least a proportion of the thermoplastic material has been injected into the mould cavity 152 to dispose the core 160 in a final moulding forward position in which the mould cavity 152 defines the final shape and dimensions of the thermoplastic preform 102. During the forward core movement, the pressure of the injected molten thermoplastic material is substantially uniform around the circumference of the annular substantially frustoconical funnel 174.

The mould cavity 152 is filled with the molten thermoplastic material. After filling the mould cavity 152, during the return of the core 160 from the rearward position to the forward position, excess molten material may be expelled back through the gate 164 against a holding phase pressure which is less than the injection pressure. The holding phase pressure is applied to the injected material by an injection apparatus, the holding phase pressure being selected to accommodate shrinkage of the injected material within the mould during cooling. After the injected material has solidified, the applied external pressure is reduced during cooling of the injected material. The reduction of the applied external pressure can be triggered at the start of the cooling phase, or after a short delay to allow the injection pressure to diminish.

For at least a part of the injection step, or for all of the injection step, the molten thermoplastic material is injected into the mould cavity 152 thorough the gate 164 at a flow rate of from 20 to 200 grams per second, optionally from 40 to 200 grams per second, further optionally from 40 to 100 grams per second or 100 to 200 grams per second. The injection step is typically carried out in a period of less than 2 seconds, optionally less than 1 second, further optionally less than 0.5 seconds, still further optionally less than 0.2 seconds, further optionally from 0.075 to 0.125 seconds.

Typically, the injection step, the rearward core movement to form the funnel and the subsequent forward core movement to the final moulding forward position are carried out over a total time period of less than 10 seconds, optionally less than 8 seconds, optionally from 3 to less than 6 seconds.

The core 160 is urged into the forward position by an applied external pressure, applied by an actuator, and moved to the rearward position by pressure of the injecting molten material. The actuator pressure is less than 20 bar, when applied by compressed air or 225 bar for a hydraulic fluid. Typically, an area ratio between the actuator area and the area of the core is less than 20:1 for pneumatic actuation.

After substantially filling the mould, the mould surface is restored to its original position. There is no increase in component weight or cooling time. The excess material is pushed back through the open injection inlet against the low holding phase pressure.

Although various embodiments of the present invention have been described in detail, it will be apparent to those skilled in the art that other modifications of the injection moulded preform and the injection moulding method may be employed that are within the scope of the invention as defined in the appended claims.

The invention claimed is:

1. An injection moulded thermoplastic preform for blow moulding to form a container, the preform comprising a lower closed base portion, a hollow body portion having an annular wall, a hollow transition portion between the lower closed base portion and the hollow body portion, and an upper open end portion adjacent to an upper part of the hollow body portion, wherein the closed base portion comprises a central portion which extends over at least 50% of an internal radius of a lower end of the hollow body portion and is either substantially flat or has a shallow concave or convex internal curvature, and the transition portion consisting essentially of an upwardly and radially outwardly tapering portion extending away from the central portion to connect to the hollow body portion, the tapering portion having a lower end adjacent to the central portion and an upper end adjacent to the hollow body portion, the tapering portion being frustoconical and defined between outer and inner frustoconical walls, the tapering portion increasing in wall thickness, measured between the outer and inner frustoconical walls, from the lower end adjacent to the central portion to the upper end adjacent to the hollow body portion so that the wall thickness, measured between the outer and inner frustoconical walls, at the upper end is greater than the wall thickness, measured between the outer and inner frustoconical walls, at the lower end, wherein the outer frustoconical wall is inclined at an angle, measured between the lower and the upper end, of from 18 to 24 degrees to a longitudinal axis of the preform and the inner frustoconical wall is inclined at an angle, measured between the lower end and upper end, of from 12 to less than 18 degrees to the longitudinal axis of the preform, and the outer frustoconical wall has a length, measured along the outer frustoconical wall between the lower closed base portion and the hollow body portion, of from 3 to 5 times the wall thickness of the annular wall of the hollow body portion and wherein the wall thickness of the tapering portion, measured at the upper end thereof adjacent to the hollow body portion, is less than the wall thickness of the hollow body portion.

2. An injection moulded thermoplastic preform according to claim 1 wherein the outer frustoconical wall is inclined at an angle of from 19 to 22 degrees to the longitudinal axis of the preform and the inner frustoconical wall is inclined at an angle of from 14 to 17 degrees to the longitudinal axis of the preform.

3. An injection moulded thermoplastic preform according to claim 2 wherein the outer frustoconical wall is inclined at an angle of from 19.5 to 20.5 degrees to the longitudinal axis of the preform and the inner frustoconical wall is inclined at an angle of from 15 to 16 degrees to the longitudinal axis of the preform.

4. An injection moulded thermoplastic preform according to claim 1 wherein the length of the outer frustoconical wall is from 3.5 to 4.5 times the thickness of the annular wall of the hollow body portion.

5. An injection moulded thermoplastic preform according to claim 1 wherein the central portion extends over at least 70%.

6. An injection moulded thermoplastic preform according to claim 1 wherein the central portion is dome shaped and has a shallow concave internal curvature with a minimum radius of internal curvature of 20 mm.

7. An injection moulded thermoplastic preform according to claim 6 wherein the central portion has a substantially constant radius of internal curvature.

8. An injection moulded thermoplastic preform according to claim 1 wherein a wall thickness of the central portion, excluding the thickness of any axial gate portion at an external surface of the central portion, is from 0.75 to 1.5 mm.

9. An injection moulded thermoplastic preform according to claim 1 wherein the wall thickness of the central portion, excluding the thickness of any axial gate portion at an external surface of the central portion, is substantially constant.

10. An injection moulded thermoplastic preform according to claim 1 wherein the wall thickness of the tapering portion, measured at the upper end, is at least 0.1 mm less than the wall thickness of the hollow body portion.

11. An injection moulded thermoplastic preform according to claim 10 wherein the wall thickness of the tapering portion, measured at the lower end thereof adjacent to the central portion, is at least 0.2 mm less than the wall thickness of the hollow body portion.

12. An injection moulded thermoplastic preform according to claim 1 wherein the tapering portion has a length of at least 5 mm.

13. An injection moulded thermoplastic preform according to claim 1 wherein the tapering portion increases in wall thickness by at least 10% from the lower end adjacent to the central portion to the upper end adjacent to the hollow body portion.

14. An injection moulded thermoplastic preform according to claim 1 wherein at least 75% of the total length of the body portion, the transition portion and the base portion has a wall thickness of less than 1.75 mm.

15. An injection moulded thermoplastic preform according to claim 1 wherein at least 90% of the total length of the body portion, the transition portion and the base portion has a wall thickness of less than 1.75 mm.

16. An injection moulded thermoplastic preform according to claim 1 wherein the body portion has a maximum wall thickness variation of 5% of the average wall thickness of the body portion.

17. An injection moulded thermoplastic preform according to claim 1 wherein a majority of the length of the body portion is substantially tubular, and the body portion is substantially cylindrical, substantially elliptical or substantially polygonal along at least 50% of the length of the body portion.

18. An injection moulded thermoplastic preform according to claim 1 wherein a wall section of the body portion has a length:wall thickness ratio of at least 75:1.

19. An injection moulded thermoplastic preform according to claim 1 wherein the upper open end portion includes a neck finish and an internal taper region connecting the body portion to the neck finish.

20. An injection moulded thermoplastic preform according to claim 1 wherein the body portion tapers radially outwardly at an angle of 1 degree or less in a direction from the transition portion to the upper open end portion.

* * * * *